(12) United States Patent
Muhammad

(10) Patent No.: US 10,740,624 B2
(45) Date of Patent: Aug. 11, 2020

(54) METHOD FOR MONITORING CONSUMPTION OF CONTENT

(71) Applicant: AmonDre Muhammad, San Francisco, CA (US)

(72) Inventor: AmonDre Muhammad, San Francisco, CA (US)

(73) Assignee: Amon'Dre Adrian Muhammad

( * ) Notice: Subject to any disclaimer, the term of this patent is extended or adjusted under 35 U.S.C. 154(b) by 205 days.

(21) Appl. No.: 15/936,130

(22) Filed: Mar. 26, 2018

(65) Prior Publication Data

US 2018/0285654 A1     Oct. 4, 2018

Related U.S. Application Data

(60) Provisional application No. 62/476,823, filed on Mar. 26, 2017, provisional application No. 62/482,404, filed on Apr. 6, 2017.

(51) Int. Cl.
```
G06K 9/00      (2006.01)
H04N 21/442    (2011.01)
H04N 21/454    (2011.01)
```

(52) U.S. Cl.
CPC ....... *G06K 9/00771* (2013.01); *G06K 9/0061* (2013.01); *G06K 9/00201* (2013.01); *G06K 9/00228* (2013.01); *G06K 9/00281* (2013.01); *G06K 9/00362* (2013.01); *H04N 21/44218* (2013.01); *H04N 21/454* (2013.01)

(58) Field of Classification Search
CPC ........... G06K 9/00221; G06K 9/00228; G06K 9/00281; G06K 9/00771; G06K 9/00778; G06T 2207/30201; G06T 2207/30232; G06T 2207/30242; G06F 21/00; G06F 21/50; G06F 2221/031; G06F 2221/2141; G06F 2221/2149; H04N 21/44218; H04N 21/44236; H04N 21/8355

See application file for complete search history.

(56) References Cited

U.S. PATENT DOCUMENTS

| | | | | |
|---|---|---|---|---|
| 9,165,144 | B1* | 10/2015 | Goldstein et al. | G06F 21/60 |
| 2008/0056542 | A1* | 3/2008 | Hung et al. | H04N 5/4403 |
| | | | | 382/118 |
| 2009/0285545 | A1* | 11/2009 | Bon | H04N 7/163 |
| | | | | 386/239 |
| 2013/0279744 | A1* | 10/2013 | Ingrassia, Jr. et al. | |
| | | | | G06F 21/32 |
| | | | | 382/103 |
| 2015/0139612 | A1* | 5/2015 | Lian | G06F 21/10 |
| | | | | 386/259 |

(Continued)

*Primary Examiner* — Andrew W Johns

(57) ABSTRACT

A system receives data of a receiving area from a receiver of a second electronic device and analyzes the data for a stopper. The system stops content from playing when the stopper is detected and provides a notification on a display of a user device. The system also receives second data of the receiving area from the receiver, analyzes the second data for the stopper, and allows the content to play when the stopper is not detected. The system also performs one or more of: (i) analyzing the data for specific audio that is known to be a sound of a recording device; and (ii) analyzing the data to determine a visual depiction of one or more eyes, to determine the number of actual viewers, and determine there is a stopper present if the number of actual viewers is greater than the number of authorized viewers.

9 Claims, 13 Drawing Sheets

(56) References Cited

U.S. PATENT DOCUMENTS

2015/0365422 A1* 12/2015 Peterson et al. .... G06F 16/9535
726/28
2018/0270530 A1* 9/2018 Ren .................. H04N 21/44218
2019/0058918 A1* 2/2019 Itzkowitz ................ G06F 3/017

* cited by examiner

METHOD FOR MONITORING CONSUMPTION OF CONTENT

PRIORITY

This application claims priority to U.S. Provisional Application No. 62/476,823, filed Mar. 26, 2017, and U.S. Provisional Application No. 62/482,404, filed Apr. 6, 2017, each of which is incorporated by reference in its entirety into this application.

BACKGROUND

There are several ways to deliver multimedia content to consumers on an electronic, image capture or video recording device(s). For example, a user may typically enter an electronic marketplace to purchase audiovisual content. Typically, these purchases are billed according to a monthly subscription or a pay-per-view service. Once purchased, the user may be presented with an interface that allows the user to play the audiovisual content. However, this interface typically does not monitor the actions or number of users watching, listening, or receiving the content. This allows users to potentially pirate the content or permit additional users than intended to receive the content.

SUMMARY

Exemplary embodiments described herein include a system, method, and application for monitoring a receiving area of audio and/or visual content to determine the occurrence of a stopper. Exemplary embodiments may prevent further reception of the audio and/or visual content while the stopper is detected, if the stopper is detected for a predetermined duration, if the stopper is determined to be an unauthorized event, until the stopper is terminated, until the stopper is rectified, and combinations thereof.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further purposes and advantages, will be better understood from the following description when considered in connection with the accompanying figures. It is to be expressly understood, however, that each of the figures is provided for the purposes of illustration and description only and is not intended as a definition of the limits of the present disclosure.

BRIEF DESCRIPTION

For a more complete understanding of the present disclosure, reference is now made to the following description taken in conjunction with the accompanying drawings.

DETAILED DESCRIPTION

Figure 1:
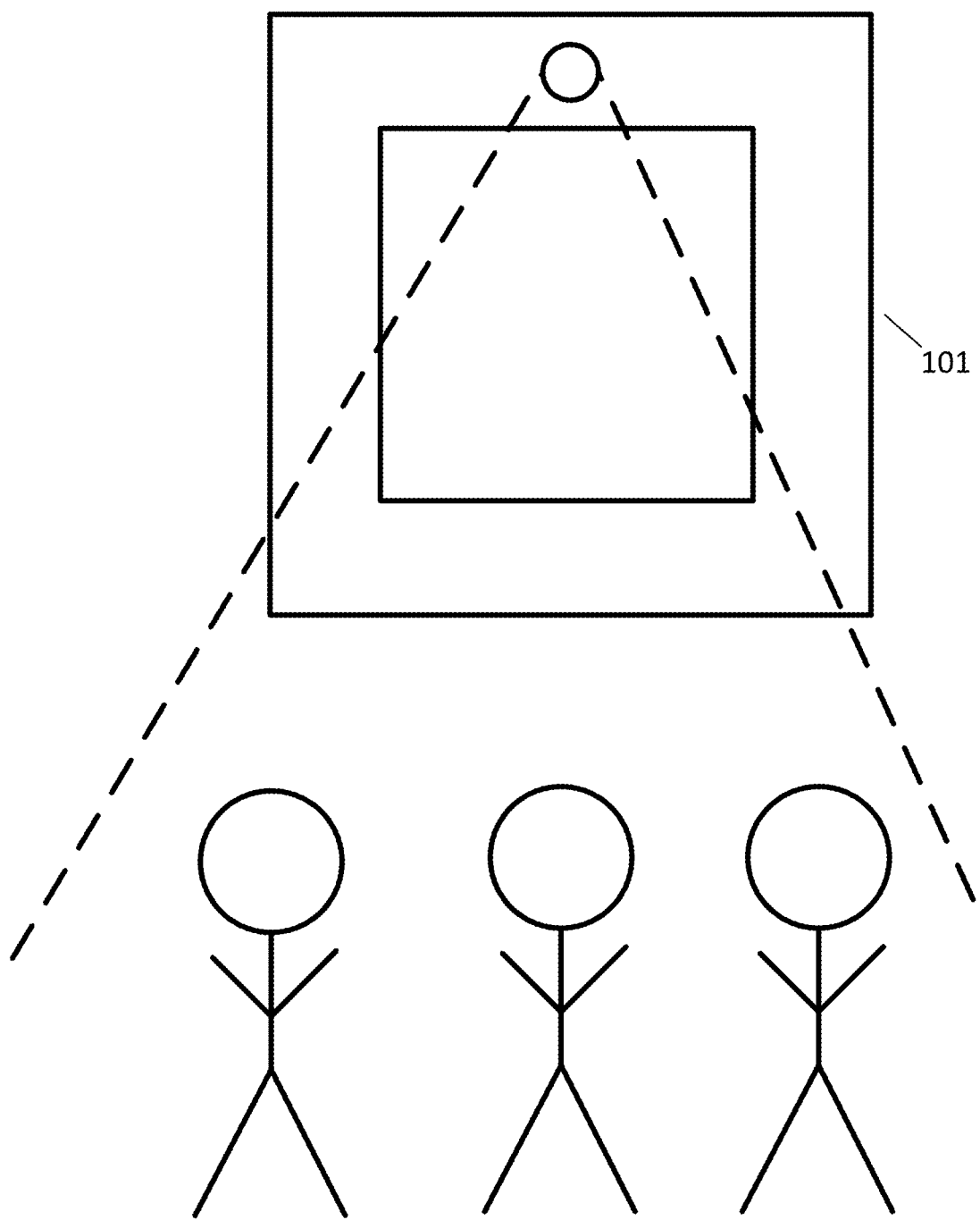
FIG. 1 illustrates an exemplary embodiment of the system for monitoring a receiving environment for a stopper according to embodiments described herein.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Exemplary embodiments described herein include a system, method, and application for monitoring a number of people receiving audio and/or visual content.

Exemplary embodiments described herein include a system, method, and application of monitoring objects within an audio or visual range of received audio and/or visual content.

Exemplary embodiments may prevent further reception of the audio and/or visual content while an unauthorized person is in the receiving vicinity, while an unauthorized person is determined to be receiving the content, while an unauthorized object is in the receiving vicinity, while an unauthorized object is determined to be recording the content, while an unauthorized activity is occurring, while an identified activity is occurring, and combinations thereof.

Exemplary embodiments described herein include an application for monitoring a receiving area of audio and/or visual content. The application may be stored in memory of a user device. The application may comprise an object recognition program. The application may use the object recognition program to receive images from a receiver of the receiving area from the user device or an external receiving device. The application may use the object recognition program to analyze a receiving area of the receiver in order to identify a stopper in the receiving area.

Exemplary embodiments described herein include a method for monitoring viewing receiving area of audio and/or visual content. The monitoring may include monitoring for the number of people in a receiving area, the objects within the receiving area, actions or events in a receiving area, and combinations thereof. Typically, when a user wishes to view a piece of audio and/or visual content, the user may make a purchase that allows the user to view the content. An authorized number of viewers may be specified. The content may begin. The application may start automatically when the content begins to play. The content may be prevented from playing until the application starts. The application may start the object recognition program once the application starts. The application may use the object recognition program to access a receiver on the user device. The application may pause or stop the content in the event the object recognition program detects a stopper. The stopper may include, but is not limited to, a number of people within the receiving area greater than a number of authorized viewers, a number of actual viewers that is greater than the authorized number of viewers, anti-facial recognition glasses, a device for capturing audio, images, and/or video, a recording device, and combinations thereof. The application may provide a notification requiring removal of the stopper. The application may allow the content to resume playing once the stopper is removed.

In the event the stopper is that the number of actual viewers is greater than the number of authorized viewers, the application may provide a prompt requiring an additional payment before the content may resume playing. The application may allow the content to resume playing once the additional payment is made. The application may allow the content to resume once the number of actual viewers is equal to or less than the number of authorized viewers.

In the event the stopper is the presence of anti-facial recognition glasses, the application may provide a prompt requiring the anti-facial recognition glasses be removed. The application may allow the content to resume playing once the anti-facial recognition glasses are removed.

In the event the stopper is a device for image capture, the application may provide a prompt requiring the device for image capture be removed. The application may allow the content to resume playing once the device for image capture is removed.

In the event the stopper is a recording device, the application may provide a prompt requiring the recording device be removed. The application may allow the content to resume playing once the recording device is removed.

The application may use the object recognition program to analyze a number of faces, one or more facial features, and/or a movement of one or more heads in order to determine the number of people that are in a receiving area of the receiver, and combinations thereof. The application may pause or stop the content in the event the facial recognition program detects a number of actual viewers in the receiving area of the receiver that is greater than the authorized number of viewers. The application may provide a prompt requiring an additional payment before the content may resume playing. The application may allow the content to resume playing once the additional payment is made.

The application may use the object recognition program to analyze images, video, sounds, and combinations thereof continuously. The application may use the object recognition to analyze images, video, or sounds at one or more predetermined intervals. The application may use the object recognition to analyze images, video, or sounds upon one or more triggers. The triggers may include, but are not limited to, a potential viewer's voice or a potential viewer's footsteps.

The application may store images, video, and/or sounds on the user device, and combinations thereof. The application may transmit the images, video, and/or sounds to a server through a network and stored on a database.

The receiving area of the receiver may be used to determine a number of actual viewers present in a viewing area. The viewing area may be a physical area, within which one or more viewers may observe, or view, the content. Exemplary viewing areas may include, but are not limited to, rooms, theaters, classrooms, trains, busses, and airports.

The application may use the object recognition program to monitor the number of actual viewers using 2D, 3D and/or 4D images. The 4D object recognition may include the 3D object recognition in addition to the dimensions of time and/or audio. The images may be captured from a receiver on a user device. The receiver may include, but is not limited to, a digital camera, a projector, an illuminator, an infrared camera, an auditory device, and combinations thereof. A digital camera or infrared camera may take one or more pictures or videos for the object recognition program. A projector or illuminator may emit one or more dots or lights on the faces of one or more potential viewers in order to provide an image of the potential viewers. An auditory device, such as but not limited to a speaker, may capture sounds. The application may compare the sounds to known sounds associated with a stopper such as, but not limited to, a recording device. Any of the above may be used individually or in conjunction with each other.

The user device may include, but is not limited to, a cellular phone, a television, a computer, or a tablet.

The application may operate with or without a network connection.

The content may be provided by a third-party. The payment may also be collected by a third party. In the event an additional payment is needed to resume playing the content, the application may transfer the user to a third-party application or website where the user will be directed to pay. The application may receive information from the third-party application on the payment. Once the application receives confirmation of payment, the application may cause the content to resume playing. The content may include, but is not limited to, television shows, first run movies, second run movies, or any combination thereof.

FIG. 1 illustrates an exemplary embodiment of the system for monitoring a receiving environment for a stopper according to embodiments described herein. As shown in FIG. 1, a user device 101 may monitor a receiving environment. The dashed lines in FIG. 1 represent the receiving area of the receiver.

Figure 2:
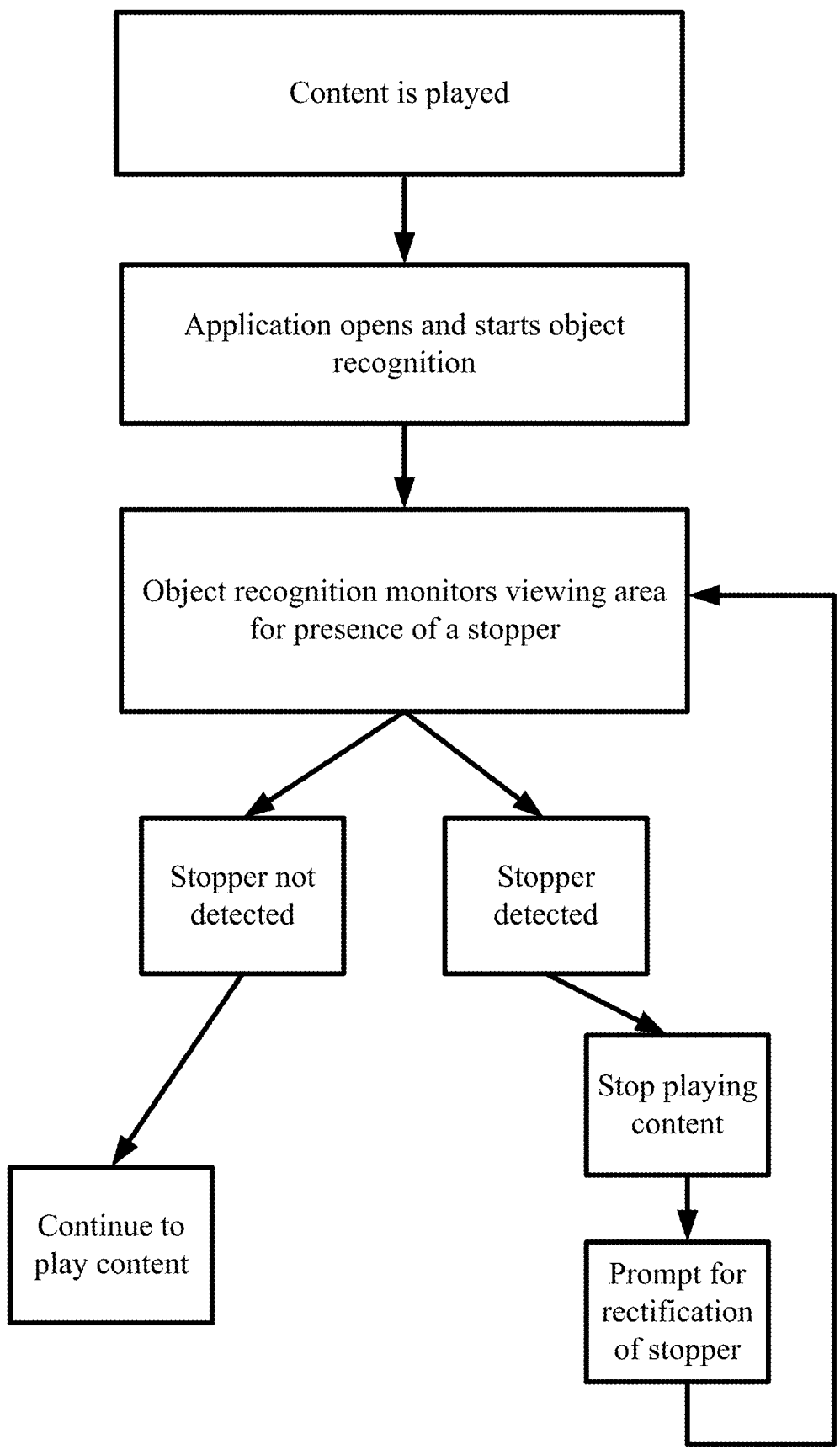
FIG. 2 illustrates an exemplary embodiment of the system for monitoring a receiving environment for a stopper according to embodiments described herein.

FIG. 2 illustrates an exemplary embodiment of the system for monitoring a number of people viewing a piece of content. As shown in FIG. 2, the content may be played. The content may be played on a user device.

The application may start automatically when the content begins to play. The content may be prevented from playing until the application starts. The application may need to be manually started before the content begins to play. The application may include an object recognition program. The application and object recognition program may continue to run as long as the content is playing.

The application may use the object recognition program to monitor a viewing area. The object recognition program may begin once the application starts. The object recognition program may begin automatically once the application starts. The object recognition program may use a receiver on the user device to capture one or more photos of the viewing area. The object recognition program may use the receiver to capture a video of the viewing area. The object recognition program may use the receiver to capture one or more sounds in the viewing area. The object recognition program may analyze the photos, video, and/or sounds, and combinations thereof.

The application may use the object recognition program to analyze the photos and/or video through different processes. The processes may operate separately or together. Any number of the processes may be used. The processes may include, but are not limited to, a counting process, a motion detection process, a facial recognition process, and a filtering process. The processes may include 2D, 3D and or 4D object recognition of images and/or video so as to determine a direction of an object. The 4D object recognition may include the 3D object recognition in addition to the dimensions of time and/or audio. The process may also include audio recognition of sounds as to determine if a stopper is present. For example, the process may recognize a recording device, by comparing a captured sound to sounds known to be associated with a recording device, and determine that the recording device is directed towards the user device.

The counting process may include counting a number of faces, heads, or facial features in the viewing area. The viewing area may include a receiving area of the receiver. The monitoring process may include detecting a motion of a face in order to determine if a potential viewer has moved into or out of the viewing environment.

The facial recognition process may include determining if a face that has entered the viewing environment is that of a previously authorized viewer. The facial recognition process may also include determining if eyes of a potential viewer are open and looking at the user device. The facial recognition may recognize eyes present in a face of the potential viewer and determine where a direction of an iris of each eye is pointing in order to determine if the potential viewer is looking at the user device. The facial recognition may recognize a number of eyes or a profile or direction of head of the potential viewer to determine whether the user's face is directed at the user device.

The filtering process may include any process that determines a likelihood of a potential viewer being an actual viewer. The filtering process may include one or more filtering mechanisms so as to filter out a potential viewer that is not viewing the content, but rather passing through the viewing environment. For example, if the potential viewer is located in the field of view, the object recognition program may analyze one or more subsequent images or videos to determine how long the potential viewer is within the viewing environment. If the potential viewer is in the viewing environment for longer than a determined time, the potential viewer may be determined to be an actual viewer. If the potential viewer is in the viewing environment for shorter than the determined time, the potential viewer may not be determined to be an actual viewer.

The application may receive a notification from the object recognition program in the event the program detects a stopper such as, but not limited to, a number of actual viewers greater than a number of authorized viewers, an anti-facial recognition glasses, or a recording device. The application may pause or stop the content in response to receiving the notification. The application may then provide a prompt requiring removal of the stopper. The application may allow the content to resume playing once the stopper is removed.

In the event a stopper is detected, the application may store one or more identifiers of the user such as, but not limited to, the user name or the user IP address. The application may send the identifiers to a database such that the database may track users that may be pirating or stealing content. The application may notify an appropriate authority based on a number of occurrences associated with a certain user.

In the event the object recognition program does not detect a stopper, the application may allow the content to continue to play without interruption.

Figure 3A:
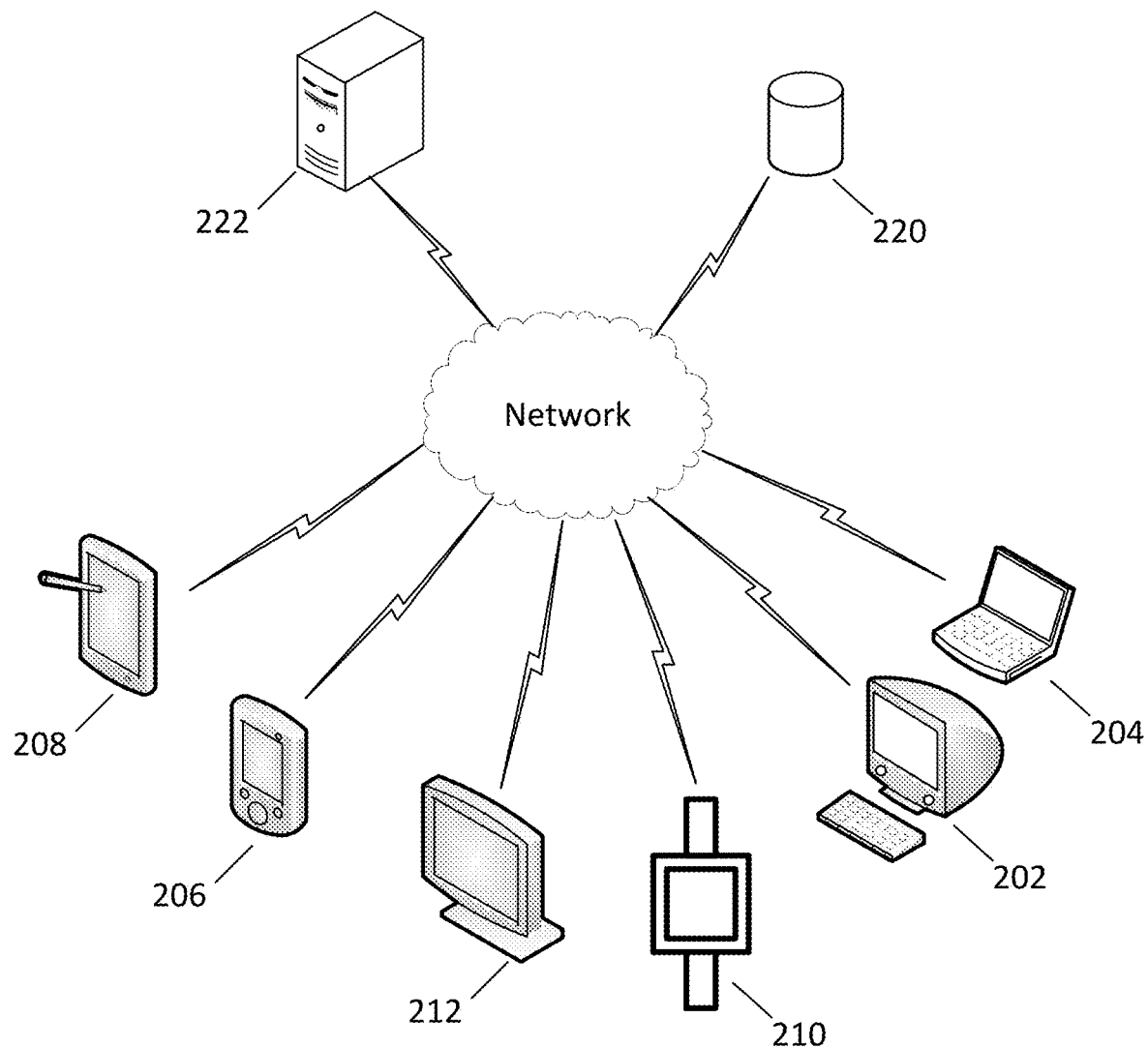
FIG. 3A illustrates an exemplary system configuration according to embodiments described herein.

FIG. 3A illustrates an exemplary system configuration according to embodiments described herein. Any combination of the disclosed features is within the scope of the instant disclosure. The application described herein may be run on a user device. The application may be stored on the user device. Exemplary user devices may include, but are not limited to, a computer 202, a laptop 204, a mobile device 206, an electronic tablet 208, a smart watch 210, and a television 212. The application may relay information between the user device and a database 220 through a server 222 via the network.

Figure 3B:
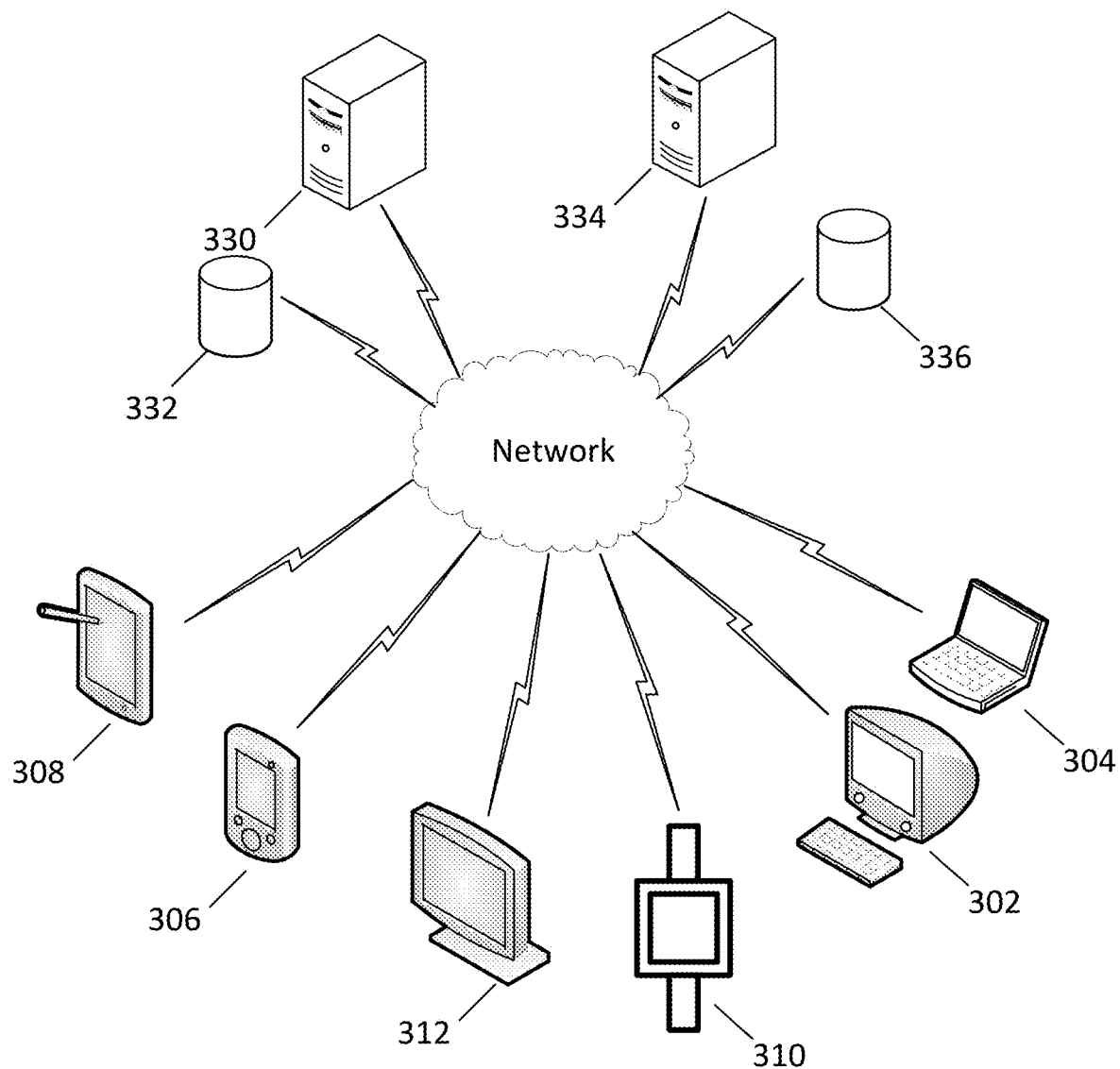
FIG. 3B illustrates an exemplary system according to embodiments described herein.

FIG. 3B illustrates an exemplary system according to embodiments described herein. As shown in FIG. 3B, a service provider server 330 and a system server 334 may be coupled to a network. The network may be used to facilitate a transfer of information from a service provider database 332 and a system database 336 to one or more user device, such as, but not limited to, a computer 302, a laptop 304, a mobile device 306, an electronic tablet 308, a smart watch 310, and a television 312. Information from the service provider database 332 may be relayed through the service provider server 330 and information from the system database 336 may be relayed through the system server 334. The system sever 334 may manage provision of the content provided by the service provider server 330. The service provider server 330 may be operated by third party.

Figure 4:
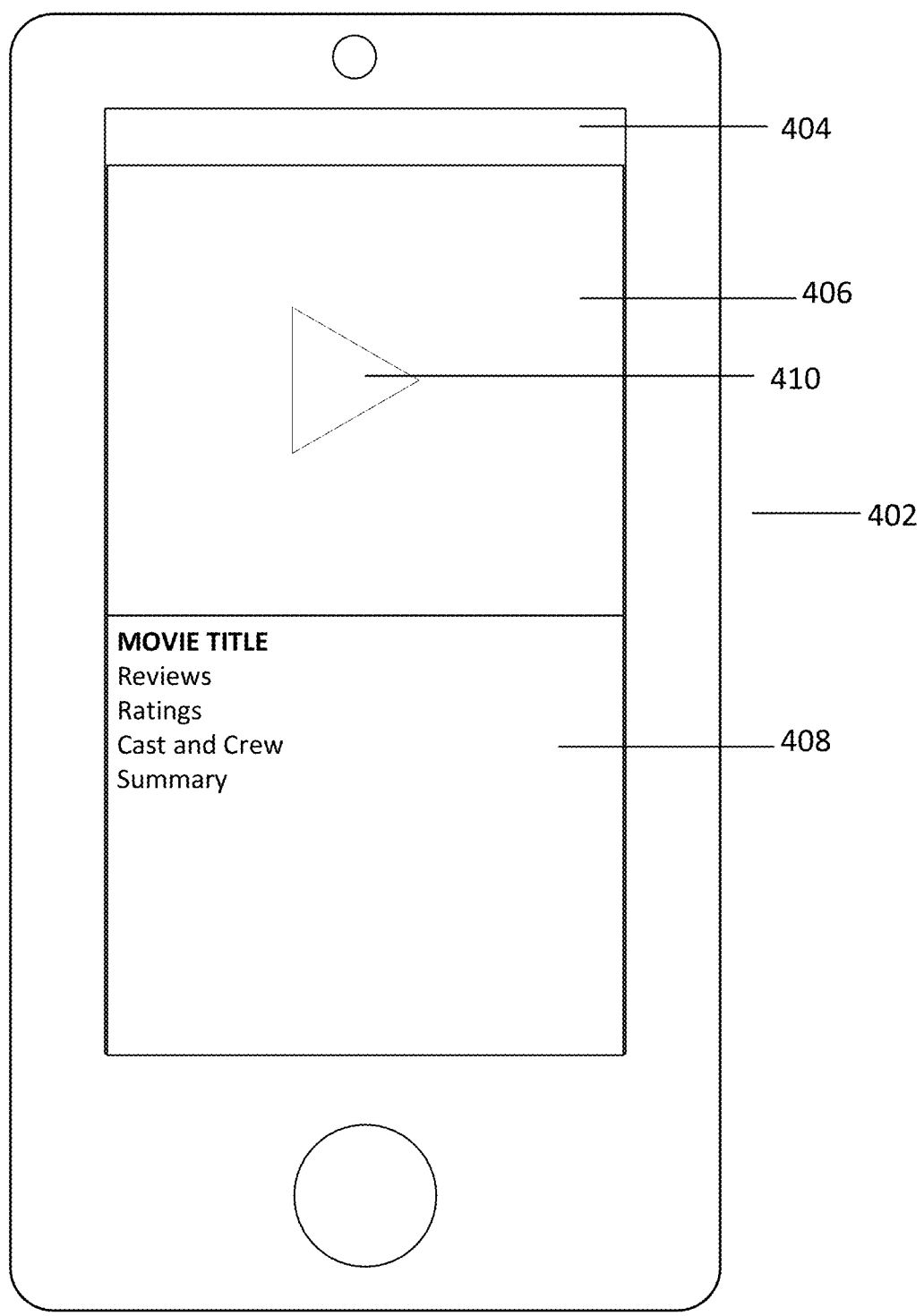
FIG. 4 illustrates an exemplary interface according to embodiments described herein.

FIG. 4 illustrates an exemplary interface according to embodiments described herein. As shown in FIG. 4, a user device 402 may include an output 404 such as, but not limited to, a screen. The output 404 may display a video portion 406 and an information portion 408. The video portion 406 may include a control 410 such as, but not limited to, a button or a switch. When the control 410 is selected, a piece of content may begin to play. The content may be displayed on the output 404. The information portion 408 may include information about the content. The information portion may include details about, but is not limited to, a title, a duration, a cast and crew, a summary, and/or ratings, and combinations thereof.

Figure 5:
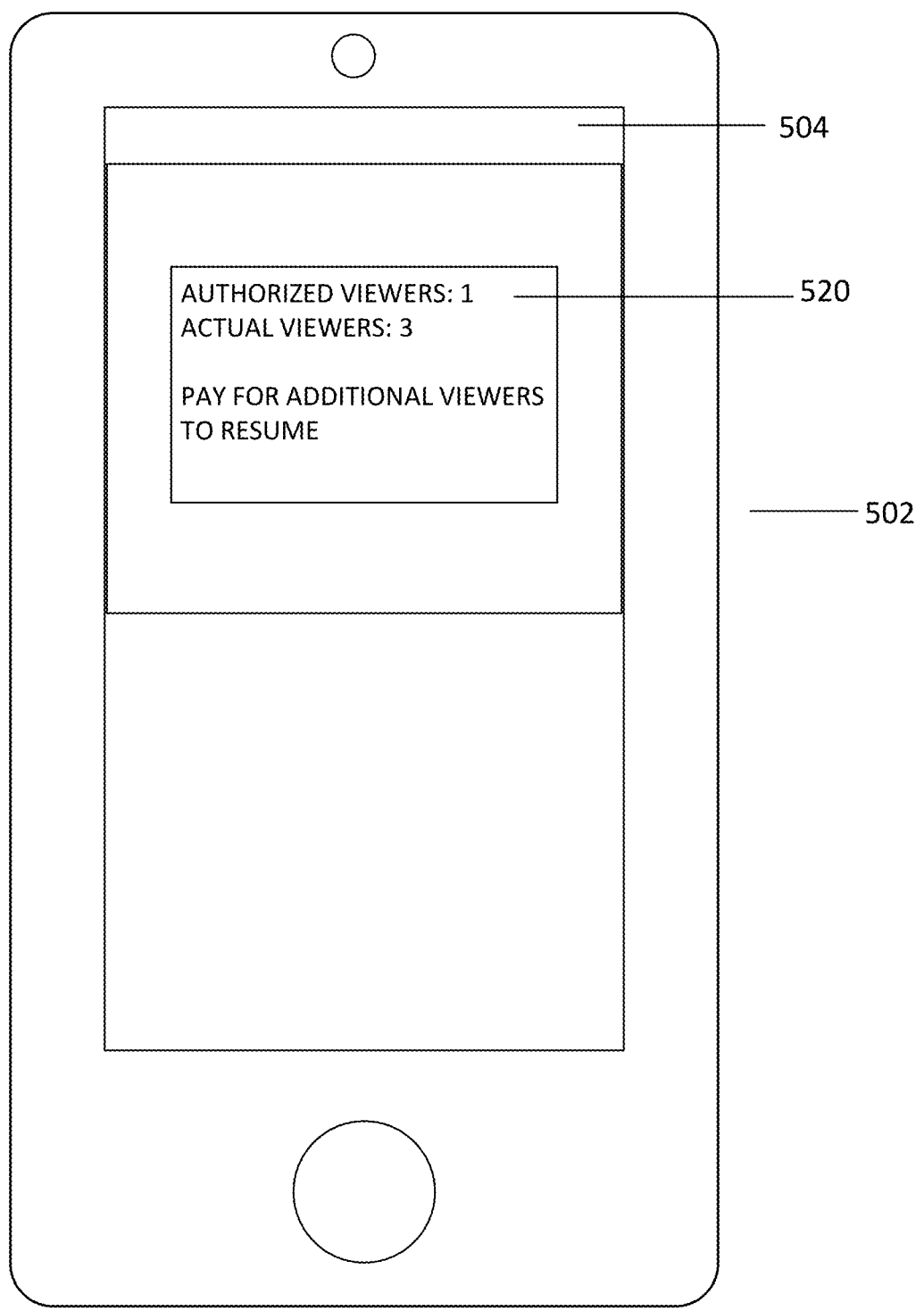
FIG. 5 illustrates an exemplary interface according to embodiments described herein.

FIG. 5 illustrates an exemplary interface according to embodiments described herein. As shown in FIG. 5, a notification 520 may be displayed on an output 504 of a user device 502 in the event a stopper is identified by the object recognition program. The notification 520 may display information about the stopper and how to remove the stopper. Once the stopper is removed, the content may continue to play.

For example, the notification 520 may be displayed on the output 504 of the user device 502 in the event a number of actual viewers is greater than a number of authorized viewers. The notification 520 may inform the user that the additional actual viewers must be paid for. Once the additional actual viewers are paid for, the content may resume playing on the user device 502.

Figure 6:
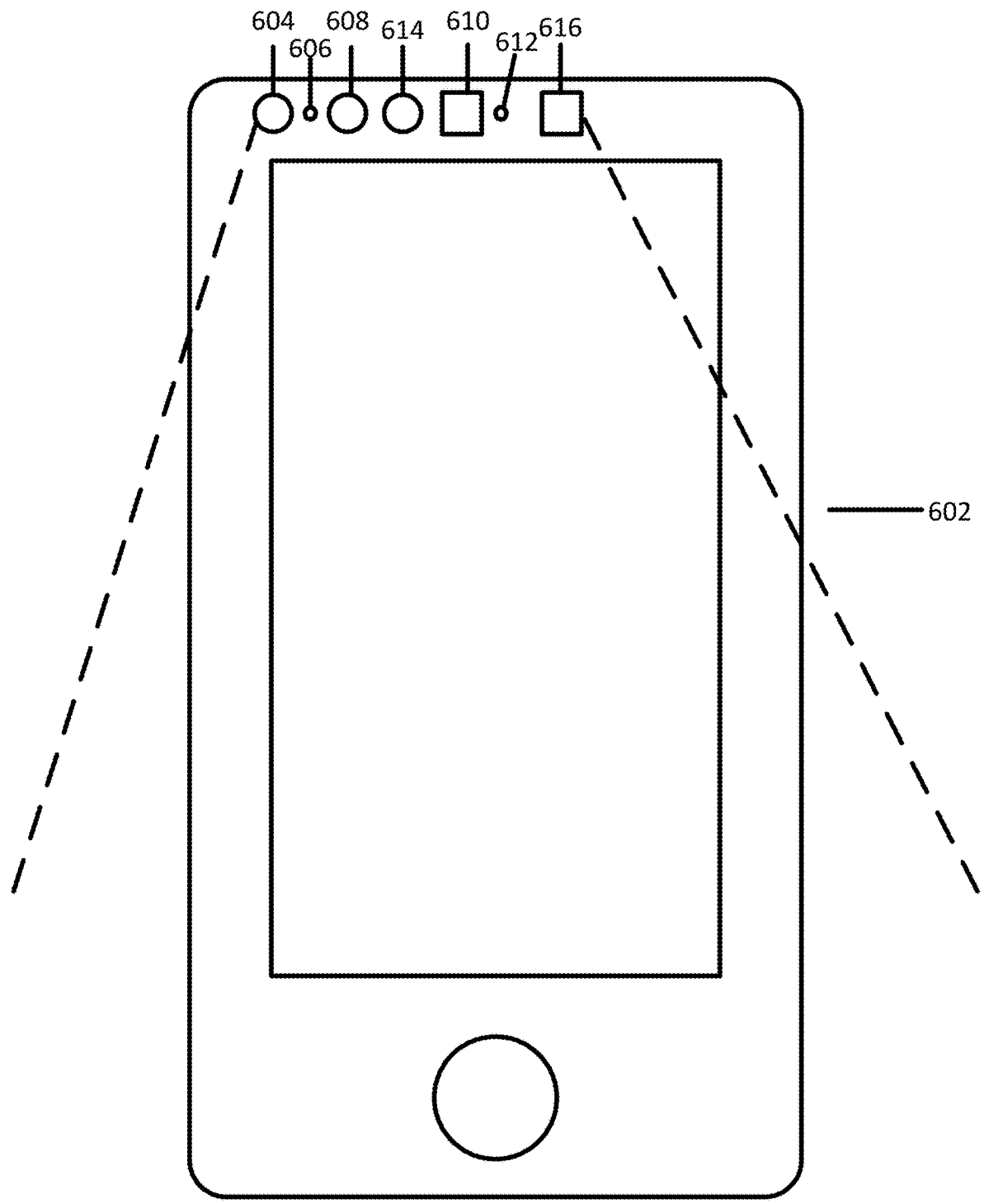
FIG. 6 illustrates an exemplary user device according to embodiments described herein.
Figure 7A:
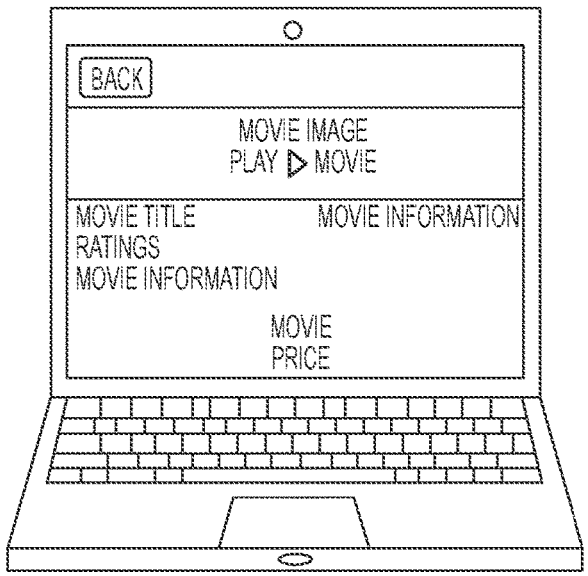
FIG. 7A illustrates an exemplary interface according to embodiments described herein.
Figure 7B:
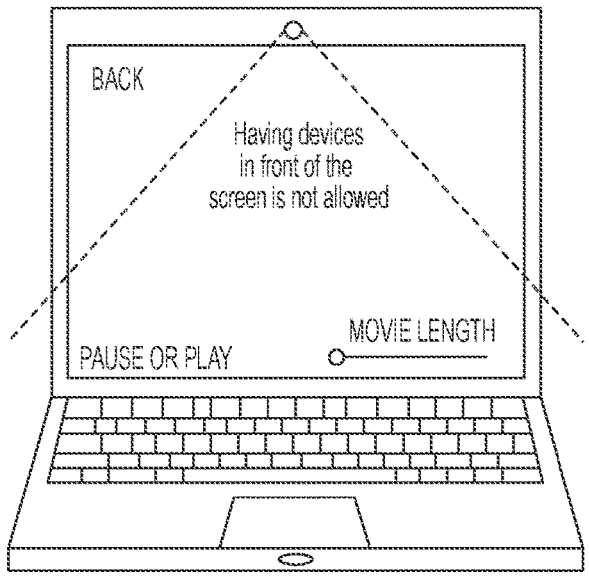
FIG. 7B illustrates exemplary user devices according to embodiments described herein.
Figure 7C:
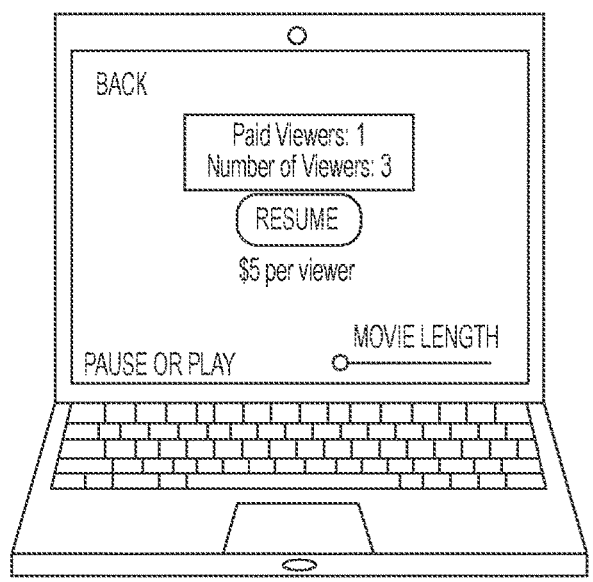
FIG. 7C illustrates an exemplary interface according to embodiments described herein.
Figure 8A:
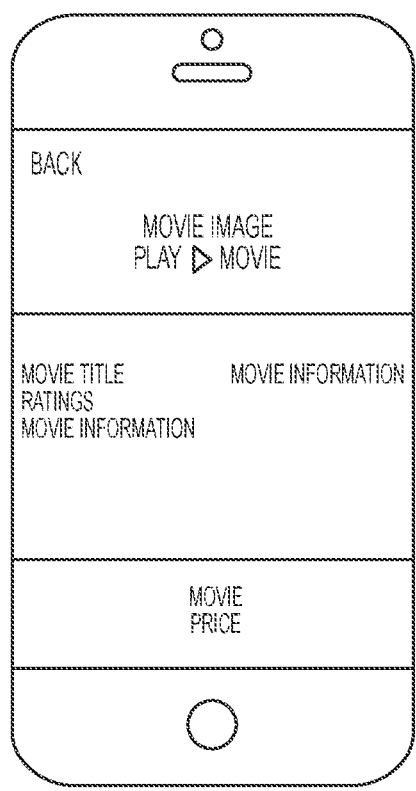
FIG. 8A illustrates an exemplary interface according to embodiments described herein.
Figure 8B:
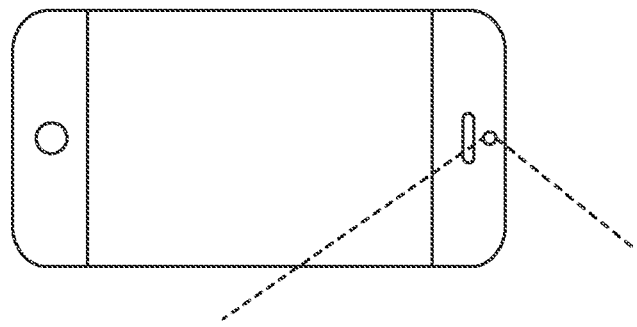
FIG. 8B illustrate exemplary user devices according to embodiments described herein.
Figure 8C:
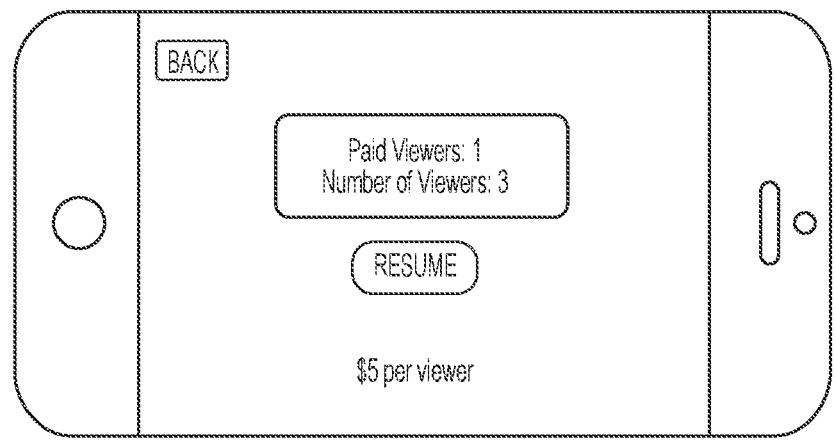
FIG. 8C illustrates an exemplary interface according to embodiments described herein.
Figure 9A:
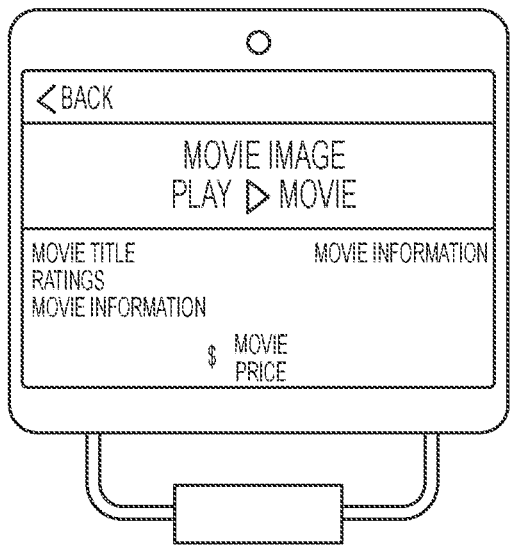
FIG. 9A illustrates an exemplary interface according to embodiments described herein.
Figure 9B:
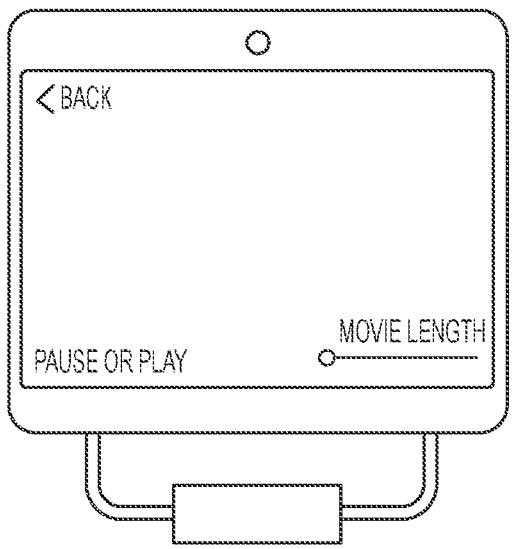
FIG. 9B illustrates an exemplary interface according to embodiments described herein.
Figure 9C:
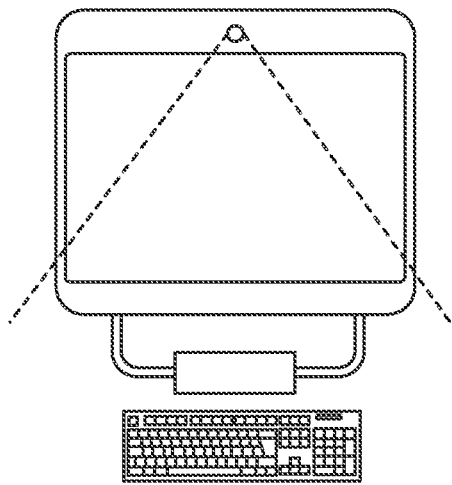
FIG. 9C illustrates an exemplary interface according to embodiments described herein.
Figure 9D:
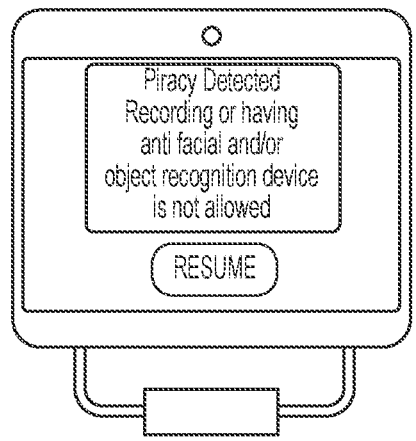
FIG. 9D illustrates an exemplary interface according to embodiments described herein.
Figure 9E:
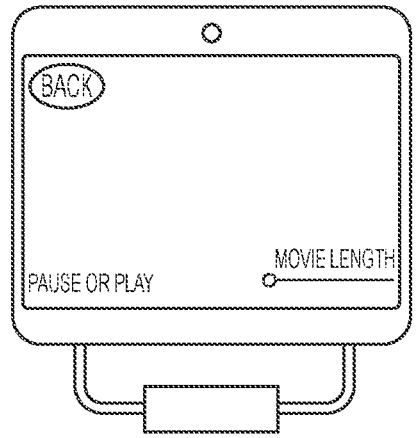
FIG. 9E illustrates an exemplary interface according to embodiments described herein.
Figure 10A:
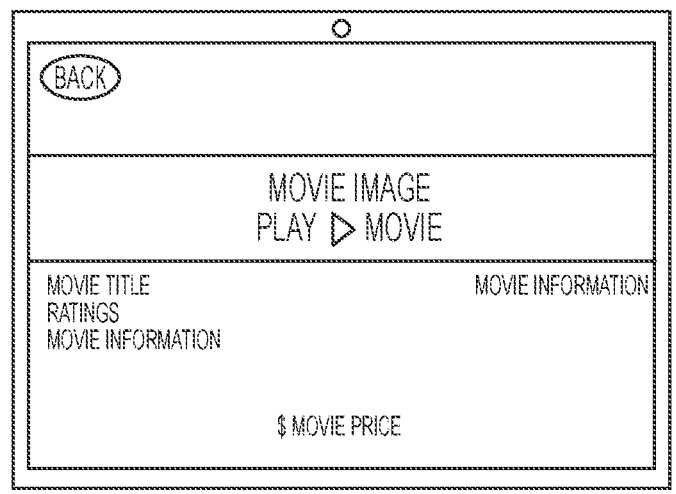
FIG. 10A illustrates an exemplary interface according to embodiments described herein.
Figure 10B:
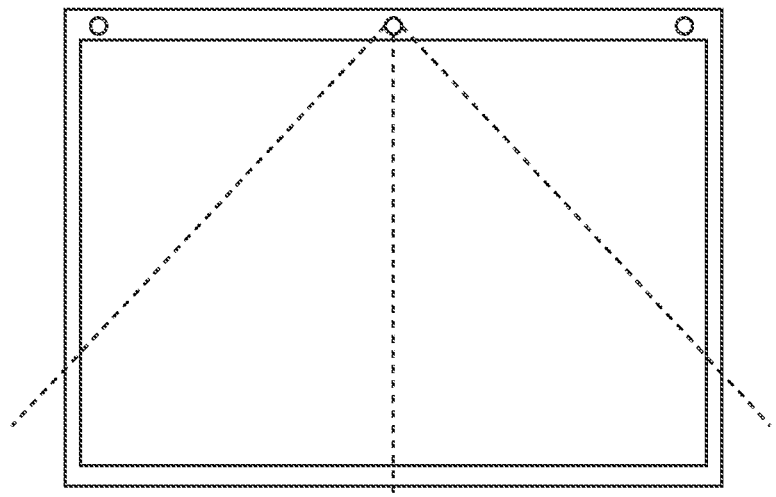
FIG. 10B illustrate exemplary user devices according to embodiments described herein.
Figure 10C:
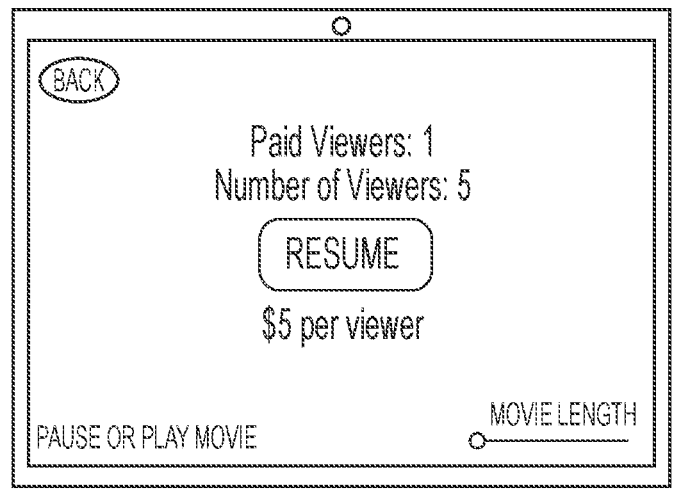
FIG. 10C illustrates an exemplary interface according to embodiments described herein.
Figure 11A:
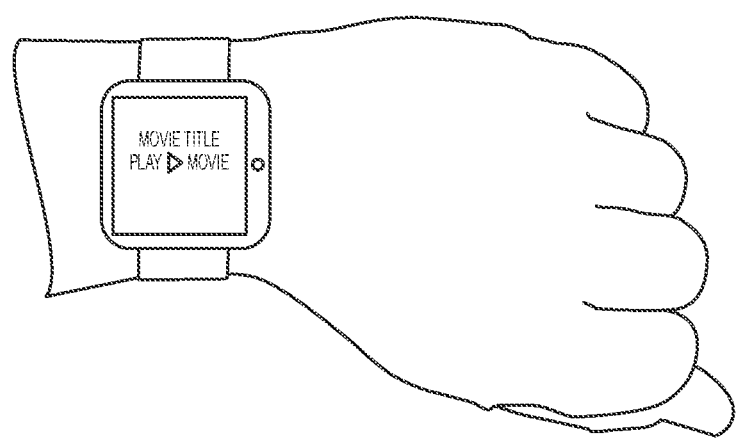
FIG. 11A illustrates an exemplary interface according to embodiments described herein.
Figure 11B:
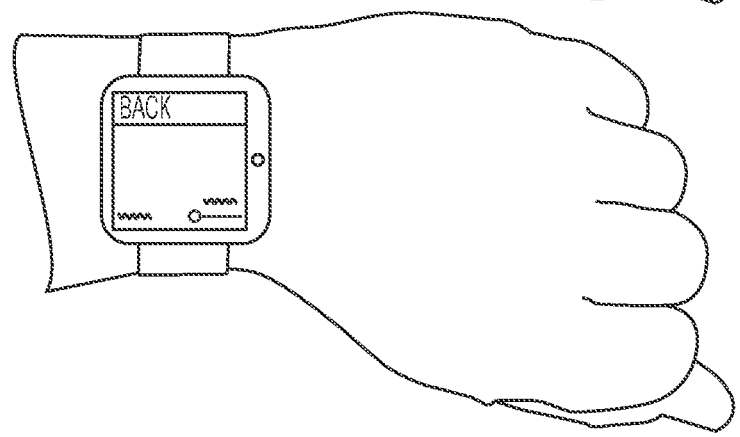
FIG. 11B illustrate exemplary user devices according to embodiments described herein.
Figure 11C:
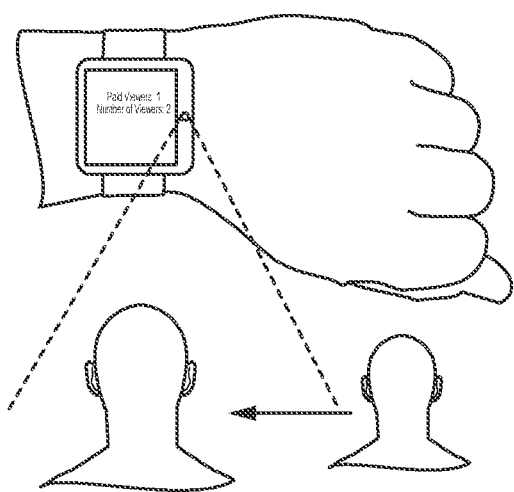
FIG. 11C illustrates an exemplary interface according to embodiments described herein.
Figure 11D:
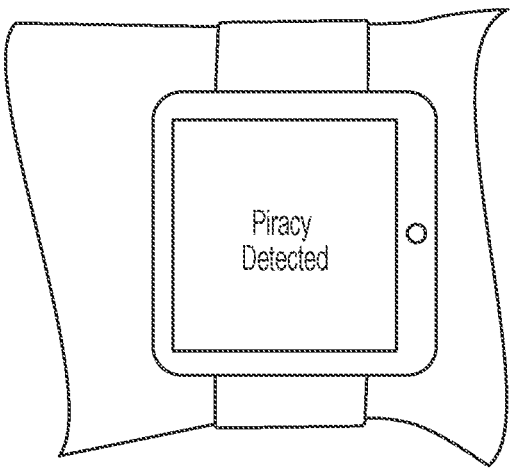
FIG. 11D illustrates an exemplary interface according to embodiments described herein.
Figure 12A:
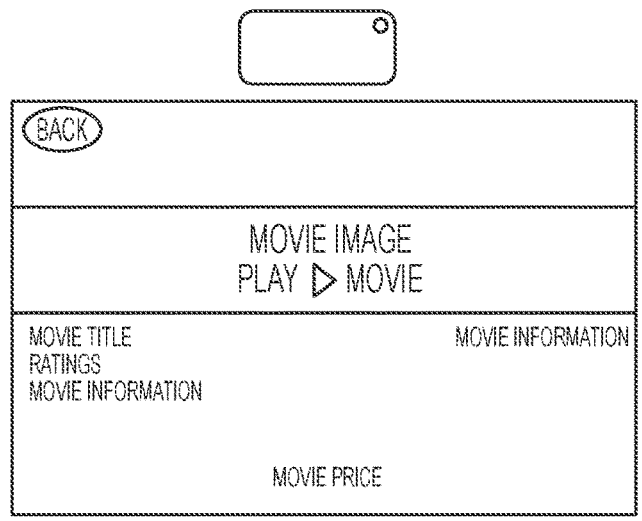
FIG. 12A illustrates an exemplary interface according to embodiments described herein.
Figure 12B:
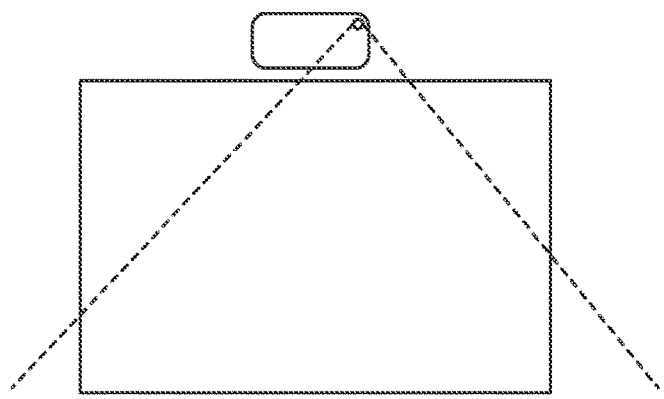
FIG. 12B illustrate exemplary user devices according to embodiments described herein.
Figure 12C:
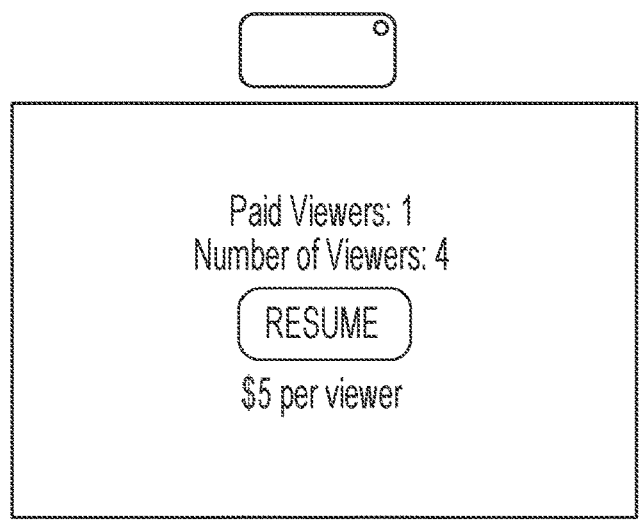
FIG. 12C illustrates an exemplary interface according to embodiments described herein.

FIG. 6 illustrates an exemplary user device according to embodiments described herein. As shown in FIG. 6, the user device 602 may include a receiver such as, but not limited to, an infrared camera 604, a digital camera 606, an illuminator 608, a projector 610, a light sensor 612, a microphone 614, and a microphone 616, and combinations thereof. The dashed lines in FIG. 6 represent a receiving area of the receiver.

FIGS. 7A, 8A, 9A, 10A, 11A, and 12A illustrate an exemplary interface according to embodiments described herein. FIGS. 7A, 8A, 9A, 10A, 11A, and 12A illustrate the interface as described in FIG. 4 on a laptop computer, a tablet, a desktop computer, a television, a smart watch, and a phone in conjunction with a television, respectively.

FIGS. 7B, 8B, 9B, 10B, 11B, and 12B illustrate exemplary user devices according to embodiments described herein. FIGS. 7B, 8B, 9B, 10B, 11B, and 12B illustrate a receiving area of a receiver as described in FIG. 6 on a laptop computer, a tablet, a desktop computer, a television, a smart watch, and a phone in conjunction with a television, respectively.

FIGS. 7C, 8C, 9C, 10C, 11C, and 12C illustrate an exemplary interface according to embodiments described herein. FIGS. 7C, 8C, 9C, 9D 9E 10C, 11C, 11D and 12C illustrate the interface as described in FIG. 5 on a laptop computer, a tablet, a desktop computer, a television, a smart watch, and a phone in conjunction with a television, respectively.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a view of the device as shown in the present disclosure. Of course, if the device is inverted, above becomes below, and vice versa. Additionally, if oriented sideways, above and below may refer to sides of a device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, and algorithm steps described in connection with the disclosure herein may be implemented as various different types of materials and/or various different combinations of materials. To clearly illustrate this interchangeability, various illustrative components, blocks, modules, and steps have been described above generally in terms of their functionality. The various materials and/or combinations of materials employed to implement the present disclosure depends upon the particular application and design constraints imposed on the overall system. Skilled artisans may implement the described functionality in varying ways for each particular application, but such implementation decisions should not be interpreted as causing a departure from the scope of the present disclosure.

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although several embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims.

What is claimed is:

1. A system, comprising:
an application stored on a non-transitory machine readable storage medium that, when executed by a processor of a first electronic device, is configured to:
receive data of a receiving area from a receiver of a second electronic device;
analyze the data for a stopper;
stop a piece of content from playing when the stopper is detected;
provide a notification on a display of a user device when the stopper is detected, wherein the notification provides information on the stopper;
receive a second data of the receiving area from the receiver, analyze the second data for the stopper, and allow the content to play when the stopper is not detected; and
perform one or more of:
(i) analyze the data for a specific audio that is known to be a sound of a recording device;
(ii) analyze the data for a period of time, determine a visual depiction of one or more eyes, determine an orientation of a face of one or more viewers, determine if the one or more viewers are one or more actual viewers, count a number of actual viewers, and determine there is a stopper present if the number of actual viewers is greater than a number of authorized viewers; and (iii) analyze the data for a period of time, determine a movement of one or more viewers, determine if the one or more viewers are one or more actual viewers, count a number of actual viewers, and determine there is a stopper present if the number of actual viewers is greater than a number of authorized viewers.

2. The system from claim 1, wherein the stopper comprises a number of actual viewers that is greater than an authorized number of viewers, anti-facial recognition glasses, a device for image capture, or a recording device.

3. The system from claim 1, wherein the application is further configured to use one or more processes to search the data wherein the one or more processes comprise: a counting process, a motion detection process, a facial recognition process, or a filtering process.

4. The system from claim 1, wherein the receiver comprises a digital camera, a projector, an illuminator, an infrared camera, or an auditory device.

5. A method for monitoring a number of people viewing a piece of content, comprising:

starting a piece of content on a user device;

launching an application stored on a non-transitory machine readable storage medium that when executed by a processor monitors a receiving area of a receiver through the user device;

monitoring of the receiving area by the application for a stopper;

wherein the application is configured to provide a notification when the stopper is identified by the application; and stopping the content when the stopper is identified by the application;

wherein the application monitors the receiving area by:

analyzing the data for a specific audio that is known to be a sound of a recording device;

analyzing the data for a period of time, determining a visual depiction of one or more eyes, determining an orientation of a face of one or more viewers, determining if the one or more viewers are one or more actual viewers, counting a number of actual viewers, and determining there is a stopper present if the number of actual viewers is greater than a number of authorized viewers; or analyzing the data for a period of time, determining a movement of one or more viewers, determining if the one or more viewers are one or more actual viewers, counting a number of actual viewers, and determining there is a stopper present if the number of actual viewers is greater than a number of authorized viewers.

6. The method from claim 5, further comprising resuming the content when the stopper is removed.

7. The method from claim 5, wherein the notification provides information about the stopper.

8. The method from claim 5, wherein the stopper comprises a number of actual viewers that is greater than an authorized number of viewers, an anti-facial recognition glasses, a device for image capture, or a recording device.

9. The method from claim 5, wherein the application uses an object recognition program to monitor the receiving area wherein the object recognition program comprises a counting process, a motion detection process, a facial recognition process, or a filtering process.

* * * * *